(12) United States Patent
Portnoy et al.

(10) Patent No.: US 9,569,292 B2
(45) Date of Patent: Feb. 14, 2017

(54) REMOTABLE CONTRACTS FOR THE WEB

(71) Applicant: Microsoft Corporation, Redmond, WA (US)

(72) Inventors: Will Portnoy, Woodinville, WA (US); Steve Ickman, Snoqualmie, WA (US); Tom Laird-McConnell, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 460 days.

(21) Appl. No.: 13/776,520

(22) Filed: Feb. 25, 2013

(65) Prior Publication Data

US 2014/0245134 A1      Aug. 28, 2014

(51) Int. Cl.
  *G06F 17/22*   (2006.01)
  *G06F 9/54*    (2006.01)
  *G06F 9/44*    (2006.01)

(52) U.S. Cl.
  CPC ............. *G06F 9/546* (2013.01); *G06F 9/4443* (2013.01)

(58) Field of Classification Search
  CPC ...................................................... G06F 17/22
  USPC ........................................................ 715/240
  See application file for complete search history.

(56) References Cited

U.S. PATENT DOCUMENTS

| | | | |
|---|---|---|---|
| 6,865,599 B2 | 3/2005 | Zhang | |
| 7,614,003 B2 | 11/2009 | Brichford et al. | |
| 8,365,061 B1 * | 1/2013 | Bloom | G06F 17/3089 715/205 |
| 8,490,117 B1 * | 7/2013 | Brichford | 719/328 |
| 9,037,963 B1 * | 5/2015 | Chandi | 715/234 |
| 2007/0113237 A1 * | 5/2007 | Hickson | G06F 9/542 719/318 |

(Continued)

OTHER PUBLICATIONS

Collin Jackson, Helen Wang; Subspace: Secure Cross-Domain Communication for Web Mashups, in Proc. of the 16th International World Wide Web Conference (WWW 2007), pp. 611-619.*

(Continued)

*Primary Examiner* — Frank D Mills
(74) *Attorney, Agent, or Firm* — Steve Wight; Cassandra T. Swain; Micky Minhas

(57) ABSTRACT

A "Remotable Contract Implementation", as described herein, provides various techniques for implementing static type checking of remoted contracts across iframes using scripts such as TypeScript, JavaScript, AJAX, etc., thereby enabling structured data and rich patterns of control flow across iframe boundaries. The Remotable Contract Implementation enables the static type-checking over the limited browser postMessage channel of communication across iframes, by generating statically type-checked proxies at runtime based on dynamic reflection, and allowing for full fidelity of JavaScript control flow interactions (e.g. methods, events, asynchronous communications, etc.) over that channel. Further, in various embodiments, the Remotable Contract Implementation provides various methods that can be used to produce useful application context for otherwise isolated applications by providing access to particular browser resources or information that would otherwise be unavailable over the postMessage communication channel using conventional scripting techniques.

20 Claims, 5 Drawing Sheets

(56) References Cited

U.S. PATENT DOCUMENTS

| | | | | |
|---|---|---|---|---|
| 2010/0299588 | A1* | 11/2010 | Dattilo | G06F 3/1205 715/234 |
| 2011/0225495 | A1* | 9/2011 | Casalaina et al. | 715/716 |
| 2011/0289476 | A1* | 11/2011 | Pletter et al. | 717/107 |
| 2012/0023158 | A1* | 1/2012 | Kashyap | H04L 63/0428 709/203 |
| 2013/0117185 | A1* | 5/2013 | Collison | G06Q 20/3829 705/67 |
| 2014/0006598 | A1* | 1/2014 | Uola | G06F 9/5077 709/224 |
| 2014/0181819 | A1* | 6/2014 | Mickens | G06F 21/53 718/100 |

OTHER PUBLICATIONS

"What does idl attribute mean in the WHATWG html5 standard document?" with entries on Sep. 10 and 14, 2012; http://stackoverflow.com/questions/12354918/what-does-idl-attribute-mean-in-the-whatwg-html5-standard-document.*

Adam Barth, Collin Jackson, William Li; Attacks on JavaScript Mashup Communication, published in conjunction with Web 2.0 Security & Privacy 2009 conference, pp. 1-8.*

Ian Hickson, HTML5 Web Messaging, W3C, Mar. 13, 2012, pp. 1-21.*

Zarandioon, Saman, Danfeng Yao, and Vinod Ganapathy. "Omos: A framework for secure communication in mashup applications." In Computer Security Applications Conference, 2008. ACSAC 2008. Annual, pp. 355-364. IEEE, 2008.*

"Use WinJS to post a message from an iFrame to your Win8 App", Retrieved at <<http://css.dzone.com/articles/use-winjs-post-message-iframe>>, Dec. 19, 2012, pp. 3.

"Javascript Remoting Dangers", Retrieved at <<http://www.gnucitizen.org/blog/javascript-remoting-dangers/>>, Jan. 30, 2007, pp. 5.

"Cross-Domain Communication with IFrames", Retrieved at <<http://softwareas.com/cross-domain-communication-with-iframes>>, May 6, 2011, pp. 9.

"Cross domain frame communication without location polling", Retrieved at <<http://ajaxian.com/archives/cross-domain-iframe-communication-without-location-polling>>, Aug. 24, 2009, pp. 4.

Hanov, Steve., "Cross-domain communication the HTML5 way", Retrieved at <<http://stevehanov.ca/blog/index.php?id=109>>, Nov. 25, 2010, pp. 7.

"JavaScript Remoting for Apex Controllers", Retrieved at <<http://www.salesforce.com/us/developer/docs/pages/Content/pages_js_remoting.htm>>, Retrieved Date: Jan. 3, 2013, pp. 5.

* cited by examiner

REMOTABLE CONTRACTS FOR THE WEB

BACKGROUND

Scripts written using various scripting languages, such as TypeScript, JavaScript, AJAX (Asynchronous JavaScript and XML), etc., have generally been restricted to run in a browser sandbox for security purposes. However, the usage of HTML "iframes" (inline frames) allows a page from one domain to contain content from another page on another domain. However, for security purposes, code in one iframe from one domain is not allowed to directly call code in another iframe from another domain.

Attempts to create some form of interoperability between iframes has led to the creation of a simple mechanism, conventionally referred to as the "postMessage" method, to communicate text strings across iframes from different domains. No executable code is allowed to be passed over the postMessage channel between iframes, just text strings.

In particular, the well-known postMessage method allows cooperative text exchange between non-trusted modules from different domains embedded within a page. It does so by ensuring a consistent and secure process for text-based data exchange. Using this method, when a script (e.g., TypeScript, JavaScript, AJAX, etc.) invokes the postMessage method on a window object, the browser sends an "onmessage" event to the target document on which the data property has been set to the value passed in the postMessage message. Further, for security, when a target Unique Resource Identifier (URI) (specifying a protocol and a host) is passed a message using the postMessage method, the message will only be received by the target window if it has the same protocol and host as the source URI.

Further, because the well-known postMessage method used with iframe coding allows only simple text strings to be passed from one iframe to another, conventional communication across iframes using the postMessage method is subject to various limitations. For example, the postMessage method is unstructured, such that no notion of object identity nor separate fields within that object, are provided. Note that using conventional techniques, simple serialization can provide some structure of fields, but doesn't allow for object identity. In addition, the postMessage method is dynamically typed, rather than statically typed, with the result that opportunities to prevent entire classes of errors are lost because such errors will only be exposed at runtime. Further, the postMessage method is one-way, such that richer patterns of control flow, such as, for example, asynchronous methods, events, lazy evaluation, and progress callbacks, are not available via conventional postMessage-based techniques.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Further, while certain disadvantages of prior technologies may be noted or discussed herein, the claimed subject matter is not intended to be limited to implementations that may solve or address any or all of the disadvantages of those prior technologies.

In general, a "Remotable Contract Implementation", as described herein, provides various techniques for annotating and translating structured code or control flow of scripts in iframes into text messages that can be passed over conventional postMessage channels between iframes, where the message is then re-translated into structured code or control flow for use by the receiving iframe. Consequently, within the context of a web browser (or multiple instances of web browsers) the Remotable Contract Implementation enables multiple iframes on the same machine to pass complex information including data, executable code, etc., between those iframes using the postMessage channel. The capabilities provided by the Remotable Contract Implementation include implementing static type-checking of remoted contracts across iframes using scripts created using TypeScript, JavaScript, AJAX, etc. (collectively referred to herein as "scripting languages"), thereby enabling the flow of structured data and rich patterns of control flow across iframe boundaries. Advantageously, the Remotable Contract Implementation is fully operable with existing browsers without requiring any modification to those browsers.

More specifically, in contrast to conventional techniques for component programming and generating proxies for remoting procedure calls, the Remotable Contract Implementation enables static type-checking of control flow in scripts over the limited browser channel of communication across iframes provided via the postMessage method. Static type checking is enabled by generating statically type-checked proxies at runtime for executable code to be passed between iframes by using dynamic reflection capabilities to evaluate that code. This enables the Remotable Contract Implementation to provide full fidelity of scripting language control flow interactions and callbacks (e.g. methods, events, asynchronous communications, etc.) over the existing postMessage channel. Further, in various embodiments, the Remotable Contract Implementation provides various techniques for use in producing useful application context for otherwise isolated applications by providing access to particular browser resources or information across iframes that would otherwise be unavailable using conventional scripting techniques.

In view of the above summary, it is clear that the Remotable Contract Implementation described herein provides various techniques for enabling the flow of structured data and rich patterns of control flow across iframe boundaries via browser postMessage channels. In addition to the just described benefits, other advantages of the Remotable Contract Implementation will become apparent from the detailed description that follows hereinafter when taken in conjunction with the accompanying drawing figures.

BRIEF DESCRIPTION OF THE DRAWINGS

The specific features, aspects, and advantages of the claimed subject matter will become better understood with regard to the following description, appended claims, and accompanying drawings where:

DETAILED DESCRIPTION OF THE EMBODIMENTS

Figure 1:
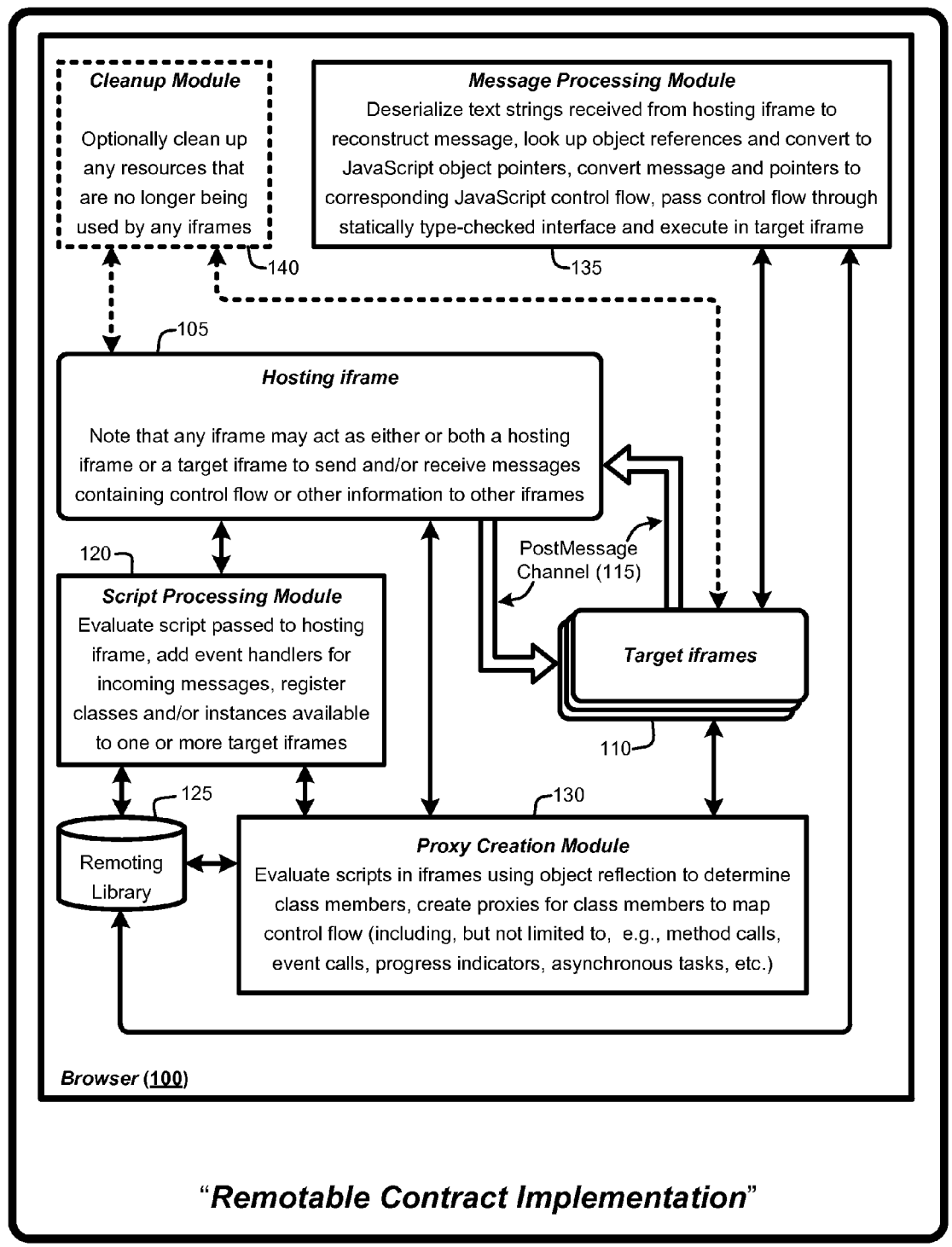
FIG. 1 illustrates an exemplary architectural flow diagram that illustrates program modules for implementing various embodiments of a "Remotable Contract Implementation," as described herein.

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction:

In the art of coding scripts for applications, objects created in a particular application domain can easily be called directly from within that domain. However, making such objects available outside of that domain (i.e., across domain boundaries) is more complex. For the purposes of distributed applications, there are two categories of objects: nonremotable objects and remotable objects. In general, as is known to those skilled in the art of browser and component (e.g., COM) coding or scripting, the concept of "remoting" is used to separate the idea of the location of a component from the location of the callers of a component.

Nonremotable objects are those that do not leave their application domain, further they are not marshaled because they do not declare a method of serialization. These nonremotable objects are designed for use within the same application domain in which they were created and are accessed directly from that application domain. Note that most base classes in the .NET Framework class library are nonremotable objects. Nonremotable objects from a particular domain are not copied or represented in another application domain. In other words, nonremotable objects are accessible from their original application domain and are not available to other domains.

In contrast, remotable objects are objects that can be accessed outside their application domain or context using a proxy. Alternatively, such objects can be copied and these copies can be passed outside their application domain or context. In other words, some remotable objects are passed by reference (i.e., by proxy) and some remotable objects are passed by value (i.e., by copy).

Further, as is known to those skilled in the art of browser and component coding, a "contract" is a non-versioning interface that defines a protocol for communicating types across an isolation boundary. One of the first steps in developing a communication pipeline between a host and an add-in is to define a contract across the interface between the host and the add-in. If the host and the add-in are loaded into separate application domains (e.g., separate iframes), an isolation boundary exists between the add-in side of the pipeline and the host side of the pipeline. By using contracts to communicate over an isolation boundary, the add-in model prevents the host's and add-in's implementations of the types from leaking across the boundary and causing versioning issues.

Most current HTML-based browsers allow individual web pages to concurrently display multiple iframes, with each iframe including content from potentially different domains. Unfortunately, as is known to those skilled in the art, conventional browser-based operations and communications do not allow code in one iframe to directly call or execute code in other iframes, although the postMessage method does allow text strings to be passed between iframes.

Advantageously, a "Remotable Contract Implementation", as described herein, processes structured code in scripts created using TypeScript, JavaScript, AJAX, etc. (collectively referred to herein as "scripting languages") and provides various techniques for translating and annotating portions of any script having structured or executable code or control flow intended to be provided to another iframe into a text message that can be passed over the conventional postMessage channel between iframes. Consequently, within the context of a web browser (or multiple instances of web browsers) the Remotable Contract Implementation enables multiple iframes in one or more browser windows on the same machine to pass complex information including data, executable code, etc., between those iframes using the browser's postMessage channel.

In other words, on the sending end (i.e., a "hosting" iframe) complex executable scripts (e.g., JavaScript or other scripting language), or portions of those scripts, are automatically transformed by the Remotable Contract Implementation into annotated serialized text that are then transmitted by a logical server associated with the hosting iframe via the postMessage channel to the receiving end (i.e., a logical client associated with a "target" iframe) where it is deserialized and transformed back into complex executable scripts for execution or use by the target iframe.

Note that any iframe may act as either or both a hosting iframe or a target iframe to send and/or receive messages containing control flow or other information to any other iframes at any time. Further, any number of iframes may operate concurrently as host or target with respect to any other number of host and target iframes. However, for purposes of explanation, the following discussion will generally refer a single hosting frame interacting with a single target iframe. Increasing the numbers of interacting iframes is simply a matter of using a Unique Resource Identifier (URI) or the like to ensure that messages intended for particular iframes are received and processed by the intended iframe. Further, it should be understood that existing postMessage protocols allows text strings to be communicated between specifically identified iframes. In addition, it should also be understood that multiple target iframes can use or receive the same message from a single hosting iframe, if desired, by specifying multiple target iframes and setting up listeners for each of those target iframes for messages sent by a particular hosting iframe.

The capabilities provided by the Remotable Contract Implementation for communicating between iframes include implementing static type checking of remoted contracts across iframes, thereby enabling the flow of structured data and rich patterns of control flow across iframe boundaries. Advantageously, the Remotable Contract Implementation is fully operable with existing browsers without requiring any modification to those browsers.

For example, in various embodiments, the Remotable Contract Implementation uses a TypeScript compiler to perform static type checking for use in creating a remoting library (discussed in further detail below) that is used by the Remotable Contract Implementation to enable rich communication across iframe boundaries. However, it should be understood that the techniques described herein are fully operable without using TypeScript, and that these techniques may be fully implemented using any desired scripting language. Advantageously, TypeScript simplifies the overall process by providing statically typed "interfaces" (similar to an API, "application programming interface") that provide protocols intended to be used as an interface by software components to communicate with each other. These interfaces represent the "contract" used for communicating between domains. In general, the contract specifies what is allowed in terms of the communication interface, and everything not specifically allowed is inherently disallowed in the interface.

Note that TypeScript is a scripting language for application-scale JavaScript. TypeScript adds optional types, classes, and modules to JavaScript. TypeScript supports tools for large-scale JavaScript applications for any browser, for any host, on any OS. TypeScript compiles to clean, readable, standards-based JavaScript. TypeScript adds optional static types to JavaScript. Types are used to place static constraints on program entities such as functions, variables, and properties so that compilers and development tools can offer better verification and assistance during software development. TypeScript's static compile-time type system allows programmers to accurately express the type relationships that are expected to exist when their programs run and have those assumptions pre-validated by the TypeScript compiler. TypeScript's type analysis occurs entirely at compile-time and adds no run-time overhead to program execution. Again, it should be understood that the Remotable Contract Implementation described herein is fully operable and may be implemented without the use of TypeScript, if desired.

1.1 System Overview:

As noted above, the "Remotable Contract Implementation," provides various techniques for enabling the flow of structured data and rich patterns of control flow across iframe boundaries via browser postMessage channels. These capabilities enable the Remotable Contract Implementation to perform static type checking of remoted contracts across iframes using scripting languages, including, but not limited to, TypeScript, JavaScript, AJAX, etc. The processes summarized above are illustrated by the general system diagram of FIG. 1. In particular, the system diagram of FIG. 1 illustrates the interrelationships between program modules for implementing various embodiments of the Remotable Contract Implementation, as described herein. Furthermore, while the system diagram of FIG. 1 illustrates a high-level view of various embodiments of the Remotable Contract Implementation, FIG. 1 is not intended to provide an exhaustive or complete illustration of every possible embodiment of the Remotable Contract Implementation as described throughout this document.

In addition, it should be noted that any boxes and interconnections between boxes that may be represented by broken or dashed lines in FIG. 1 represent alternate embodiments of the Remotable Contract Implementation described herein, and that any or all of these alternate embodiments, as described below, may be used in combination with other alternate embodiments that are described throughout this document.

In general, as illustrated by FIG. 1, the processes enabled by the Remotable Contract Implementation begin operation within an instance of a browser 100 where it is desired to send structured code from a hosting iframe 105 in a browser window to a target iframe 110 in the same or another browser window across a postMessage channel 115. As noted above, any iframe may act as either or both a hosting iframe 105 or a target iframe 110 to send and/or receive messages containing control flow or other information to other iframes across the postMessage channel 115.

A script processing module 120 evaluates scripts passed (from any source, such as page source HTML or JavaScript) to the hosting iframe 105. The script processing module 120 annotates that script to add event handlers for incoming messages (expected from other iframes when the hosting iframe 105 is acting as a target iframe 110), and further annotates the script by registering classes and/or instances intended to be available to one or more target iframes. A pre-defined remoting library 125 provides the scripting language, predefined classes, proxy stubs, etc., used to annotate the script and convert the annotated script into a serialized text string for transmission to the target iframe 110 via the postMessage channel 115.

In general, the remoting library 125 includes JavaScript used to provide the script annotations used by the script processing module 120 to enable remoting objects across iframe boundaries to and from specific iframes. The remoting library 125 can include any predefined functions, methods, objects, proxy stubs, etc., desired. Further, the remoting library 125 is used by a proxy creation module 130 to evaluate scripts in either or both the hosting iframe 105 and any target iframes 110 by using object reflection to determine class members, create proxies (from the proxy stubs) for class members to map control flow (e.g., method calls, event calls, progress indicators, asynchronous tasks, etc.) into the serialized text string for transmission via the postMessage channel 115.

In general, when an incoming serialized text message is received by the target iframe 110, a message processing module 135 deserializes the received text string received from hosting iframe 105 to reconstruct the original message. The message processing module 135 then looks up object references from the remoting library 125 and converts those references to JavaScript object pointers. The message processing module 135 then converts the deserialized message and the object pointers to corresponding JavaScript control flow. The message processing module 135 then uses the remoting library 125 to pass the resulting JavaScript control flow through a corresponding statically type-checked interface before that JavaScript control flow is executed or otherwise processed in the target iframe 110.

Finally, an optional cleanup module 140 is provided by the Remotable Contract Implementation for use in optionally cleaning up any resources that are no longer being used by any hosting iframe 105 or target iframe 110. Note that while cleanup of unused resources is not specifically required, it is generally performed to ensure proper usage of computing device memory and storage, and to prevent problems including memory leaks and various security issues.

2.0 Operational Details of the Remotable Contract Implementation:

The above-described program modules are employed for implementing various embodiments of the Remotable Contract Implementation. As summarized above, the Remotable Contract Implementation provides various techniques for enabling the flow of structured data and rich patterns of control flow across iframe boundaries via browser postMessage channels. The following sections provide a detailed discussion of the operation of various embodiments of the Remotable Contract Implementation, and of exemplary methods for implementing the program modules described in Section 1 with respect to FIG. 1. In particular, the following sections provides examples and operational details of various embodiments of the Remotable Contract Implementation, including:

Conventional postMessage capabilities;

Operational discussion of the Remotable Contract Implementation;

Detailed process flow for implementing the Remotable Contract Implementation; and Exemplary scripts for implementing various embodiments and features of the Remotable Contract Implementation.

2.1 Conventional postMessage Capabilities:

As noted above, the well-known postMessage method allows cooperative text exchange between iframes. In general, when a script (e.g., TypeScript, JavaScript, AJAX, etc.) invokes the postMessage method on a window object, the browser sends an "onmessage" event to the target document on which the data property has been set to the value passed in the postMessage message. The postMessage method call does not return until event listeners of the target document have finished executing.

For example, if Document A contains a reference to a "contentWindow" property of Document B, a script in Document A can send a message to Document B by calling the postMessage method using a script similar to the following:

```
var o = document.getElementsByTagName('iframe')[0];
o.contentWindow.postMessage('Hello World', '"*"');
```

The script in Document B can then respond to a predefined message or string sent from Document A by registering a corresponding "onmessage" event handler for incoming messages using a script similar to the following:

```
window.addEventListener('onmessage',function(e) {
    if (e.domain == 'example.com') {
        if (e.data == 'Hello World')
            {e.source.postMessage('Hello', '"*"');}
        else
            {alert(e.data);} }
});
```

In other words, in the above example, if a string received by Document B that was passed from Document A via postMessage is recognized as an expected or predefined string (e.g., "if (e.data=='Hello World')"), that expected string can trigger the script in Document B to perform a particular action, such as by responding with the message "Hello" (e.g., "asource.postMessage('Hello', '"*"')").

Unfortunately, conventional postMessage techniques for scripting communication across iframes are unstructured in that they do not provide a notion of object identity or separate fields within that object. Note that conventional use of serialization techniques for use with iframe postMessage-based communication doesn't allow for object identity to be passed across iframes. Further, conventional postMessage techniques make use of dynamic typing, meaning that the opportunity to prevent entire classes of errors is lost because such errors will only be exposed at runtime. In addition, conventional postMessage techniques are "one way," such that richer patterns of control flow, including, but not limited to, asynchronous methods, events, lazy evaluation, and progress callbacks, are not available.

2.2 Operational Discussion:

In contrast to existing work in component programming and generating proxies for remoting procedure calls, the Remotable Contract Implementation described herein enables the application of static type-checking over the limited postMessage browser channel of communication across iframes, while generating proxies for target iframes at runtime based on JavaScript dynamic reflection. These proxies are constructed from statically type-checked proxy script frameworks (in the aforementioned remoting library) that are automatically annotated or adapted by the Remotable Contract Implementation to include whatever references or variables are identified via dynamic reflection in script provided to the iframes. Advantageously, this enables the Remotable Contract Implementation to provide full fidelity JavaScript control flow interactions (e.g. methods, events, asynchronous) between iframes over the postMessage browser channel.

With respect to dynamic reflection capabilities of JavaScript, it is well known that conventional object reflection capabilities in JavaScript provide a mechanism for a Java class to self-inspect and manipulate its member attributes and methods. Using reflection, it is possible for a JavaScript class to query another class for the names of all its members. The Remotable Contract Implementation adapts these capabilities to generate proxies from the statically type checked proxy frameworks in the remoting library for any classes, variables, or other objects, that a script in one iframe intends to use from other iframes.

Although TypeScript is not required by the Remotable Contract Implementation, in various embodiments, the Remotable Contract Implementation leverages the capabilities of the TypeScript compiler to perform static type checking. Among other things, the TypeScript compiler adds static type checking on top of JavaScript, allowing for certain classes of errors (e.g., type mismatches) to be detected at compile time before the code is delivered to the user. Advantageously, the Remotable Contract Implementation provides a mechanism to leverage this static type safety in the context of the limited unstructured untyped communication method (i.e., the postMessage channel) across iframes from different domains. As such, the Remotable Contract Implementation provides various techniques for implementing static type checking of remoted contracts across iframes for various scripting languages, thus allowing for structured data and richer patterns of control flow across iframe boundaries.

In general, the TypeScript compiler provides various automated mechanisms for static type checking through interfaces. However, such static type checking capabilities can also be coded directly via other scripting languages such as JavaScript and AJAX. The Remotable Contract Implementation uses a library of statically typed checked interfaces (in the aforementioned remoting library) by providing a mapping or translation from the postMessage text string provided by the browser's API to JavaScript method calls made through the type checked interfaces. The Remotable Contract Implementation dynamically generates proxies for interface methods that provide the normal method call semantics to the caller, but transparently convert method invocations to serialized string messages passed across the postMessage channel.

As part of this translation, the Remotable Contract Implementation enables preservation of a notion of object identity across iframe boundaries (instead of just passing values back and forth). This is used to build a context of state on the other side of the channel. It also allows for method invocations from iframe A to iframe B, plus callbacks originated from iframe B to iframe A to reach the right objects. For this purpose, the Remotable Contract Implementation tracks object identity across channels to correlate different method invocations on the relevant interfaces.

In addition, the Remotable Contract Implementation optionally manages object lifetimes across the channel (for optional cleanup of unused resources). This is achieved by generating proxies which ensure that when the target iframe (i.e., the client) or the hosting iframe (i.e., the server) is disposed, the other side of the remoting relation is also disposed of properly. Establishing this relationship to a specific object also involves a protocol that handles the dynamic nature of HTML iframes, i.e., the JavaScript code may not start executing in a deterministic fashion. Objects passed as parameters to these methods may also be remoted with a notion of object identity, and statically-typed interface proxies for these arguments are also dynamically generated by the Remotable Contract Implementation.

Further, the Remotable Contract Implementation enables richer forms of control flow to be built on top of the aforementioned interface methods and callbacks. For example, asynchronous method calls through a task completion or promise/deferred or future interface have a specific type of proxy generated by the Remotable Contract Implementation to mimic that control flow pattern. Events to push notifications (rather than polling) also have a specific type of proxy generated by the Remotable Contract Implementation. Progress notifications are yet another type of control flow that is marshaled across the unstructured postMessage channel with the generating of a statically-typed interface that can be type-checked by TypeScript (or other scripting language) at compile time.

Since the above-described mechanism allows for code to be invoked across the iframe security boundary, there is a possibility that malicious code from one domain running in iframe "A" could potentially exploit vulnerabilities through remote execution of code in another domain's code in iframe "B." Since this is not always desirable, in various embodiments, the Remotable Contract Implementation provides proxies that include validation code to ensure that any desired security constraints are satisfied.

Using this infrastructure, the Remotable Contract Implementation constructs a mechanism to allow for iframe-based application isolation with rich data exchange and control flow across isolation boundaries. In particular, the Remotable Contract Implementation provides a shell mechanism that allows applications more information and capability than would otherwise be possible given the limited context of the iframe sandbox. One simple example of the information available to be passed back and forth across the untyped postMessage channel is semantically-meaningful events about resizes of the browser's window. Further elaborations of these ideas allow for clipboard operations (e.g., copy/paste) among iframe applications from different domains, coupled with a standardized statically type-checked interface for data exchange of JavaScript remotable objects. Note that significantly more complex processes than these simple examples may also be implemented by the Remotable Contract Implementation since there is no barrier to the amount of executable code or information that can be processed by the Remotable Contract Implementation and sent between iframes via the postMessage channel. In other words, anything that could originally be executed only in individual iframes can now be passed or executed across any number of iframe boundaries using the techniques enabled by the Remotable Contract Implementation.

The above summarized capabilities provide a number of advantages, including, but not limited to:
Static type checking of proxy interfaces on top of unstructured string-only data channels;
Dynamic generation of proxy stubs, for statically type checked bidirectional communication across iframes;
Transparent translation of nested reference objects passed from logical servers associated with iframes to logical clients associated with other iframes;
Optional lifetime management of resources with deterministic dispose;
Structured asynchronous calls, notification events, and progress callbacks across iframe boundaries;
A protocol for establishing connection with dynamic loading iframes;
The establishment of an application context to provide services for otherwise isolated applications; and
Making practical the use of iframes as a technology to embed multiple web pages (or selected content from multiple web pages) together into a cohesive application on a single page via multiple inter-communicating iframes.

2.3 Detailed Process Flow:

As noted above, the aforementioned remoting library contains scripting code used to process scripts in iframes in order to communicate rich control flows and any other information desired across iframe boundaries. In general, each iframe that is communicating with any other iframe uses a proxy or interface to receive communications over the postMessage channel via a logical client associated with the target iframe from a local logical server associated with the hosting iframe sending the communication to the target iframe. In other words, scripts are written to use statically type-checked interfaces or proxies implemented by a logical server hosted in another iframe, and/or such scripts are written to use statically type-checked interfaces or proxies that are implemented and hosted by a server in their iframe own iframe. In either case, scripts are processed using the pre-defined remoting library to automatically generate the intermediaries (i.e., type-checked interfaces and proxies) and initialize logical servers and listeners (i.e., logical clients) that allow complex control flows to be passed and received across iframe boundaries.

Various examples of interfaces enacted by the Remotable Contract Implementation include, but are not limited to:
An interface that defines a remoting method for returning any result across iframe boundaries;
An interface that defines a remoting method for returning a date across iframe boundaries;
An interface that defines a remoting method for returning a Boolean (i.e., a "bool") across iframe boundaries;
An interface that defines a remoting method for returning a number across iframe boundaries;
An interface that defines a remoting method for returning a string across iframe boundaries;
An interface that defines a remoting method that has no return type;
An interface that defines a remoting method for returning value types asynchronously across iframe boundaries;
An interface that defines a remoting method for returning errors asynchronously across iframe boundaries;
Etc.

In general, the Remotable Contract Implementation operates for any number of iframes by first using the browser to load JavaScript code into the iframe. The Remotable Contract Implementation then initializes the remoting library for use in adding its event handlers for incoming messages and optional cleanup when the hosting iframe is closed. Any classes or instances that script in iframe wants to make available to clients in other iframes are then registered. The script in iframe is used by the remoting library to create local proxies for any classes that it wants use from other iframes (note that these iframes are asynchronously loaded and are not necessarily available at the time that the local proxies are created).

Then, given the initialization described above, when the script loaded into an iframe initiates an action, the Remotable Contract Implementation automatically calls a corresponding statically type-checked method drawn from the remoting library. A corresponding proxy (generated using JavaScript's dynamic reflection capabilities) is used to map the control-flow of the statically type-checked method as a message for passing either: 1) a method call, with "invoke" and "result" messages; 2) an event, with "subscribe", "on event", and "unsubscribe" messages; 3) a progress indication, with "on progress" and "on completed" messages; an asynchronous task, with "on resolve" and "on reject" messages. For differentiating between objects, object references are named with a unique identifier or serialization of any desired format, and the Remotable Contract Implementation then recursively generates proxies for those objects using the remoting library. The resulting messages are then serialized into a string format and the serialized text is passed through the browser's postMessage channel across iframes.

Then, when an incoming message is received over the browser's between-iframes postMessage channel, it follows the reverse of the process described above. In particular, the received text is deserialized into a message. Object references are looked up and converted into JavaScript object pointers. Conversion to of the deserialized message with object pointers to a corresponding JavaScript control flow (e.g., a method result, event callback, progress made, or asynchronous task completed) is then performed by the Remotable Contract Implementation. The resulting control flow is then passed through the corresponding statically type-checked interface drawn the remoting library.

Finally, when the script in an iframe is finished using a specific object located in a remote iframe, the Remotable Contract Implementation optionally calls dispose on the local proxy through the corresponding interface, which optionally cleans up any unused resources in the remote iframe.

2.4 Exemplary Script for Implementing the Remoting Library:

The following exemplary scripting code provides an example of how some of the various embodiments and features of the Remotable Contract Implementation may be implemented. It should be understood that given the detailed discussion provided herein and in view of the scripting code provided below, there are many ways in which the functionality of the Remotable Contract Implementation can be implemented. In fact, as is well understood by those skilled in the art of scripting, in view of the examples provided below and the discussion provided throughout this document, scripts to execute functionality similar to the Remotable Contract Implementation can be written in a wide variety of different ways to achieve similar or identical results to those described and illustrated herein. As such, it should be understood that the described functionality is not intended to be limited to the specific processes and scripting formats and examples illustrated by the following exemplary scripting code.

Exemplary scripting code for enabling various embodiments of the Remotable Contract Implementation by including the following scripts in a module using a module using variables including "var type=Score.Type" and "var serializer=Storage.Serializer".

The following script is fired when the remote side of a connection is connected and ready:

```
export interface RemoteReadyEvent
    extends IEvent
    { add(listener: (server: Server) => void): void;
      remove(listener: (server: Server) => void): void;
      trigger(server: Server): void; }
```

The following script is used to implement local logical servers for remoting objects across iframe boundaries and local logical clients. Note that the client and server both create an instance of the Server pointing at the iframe they want to remote across:

```
export class Server
    extends Score.Object
    implements Score.IDisposable
{
    // Events
    public onRemoteReady: RemoteReadyEvent;
    // Private Member Vars
    private __isRemoteReady: bool;
    private __isDisposed: bool;
    private __idCount: number;
    private __classes: { [n:string]: any; };
    private __references: { [n:string]: { obj: any; created: bool; hasEvents: bool; }; };
    private __running: { [n:string]: any; };
    private __responses: { [n:string]: IDeferred; };
    private target: Window;
    private targetOrigin: string;
    constructor(target: Window, targetOrigin: string) {
        super( );
        /// <param name="target">Window server is bound to</param>
        /// <param name="targetOrigin"> Domain of bound window for
        /// security purposes</param>
        // Init state
        this.target = target;
        this.targetOrigin = targetOrigin;
        this.onRemoteReady = new Event( );
        this.__isRemoteReady = false;
        this.__isDisposed = false;
        this.__idCount = 0;
        this.__classes = { };
        this.__references = { };
        this.__running = { };
        this.__responses = { };
        // Construction
        Server.__register(this);
        setTimeout(( ) => { this.__postMessage('{"type":"ready"}'); }, 1);
    }
```

The following script is used to implement various methods, including: a method for creating instances of remote objects; a method for creating references to objects that can be sent to target iframes, including corresponding proxies and listeners, a method for registering constructors or running instances of a class with server; and methods for disposing resources:

```
public create(className: string): IAnyResult {
    /// Creates an instance of a remote object
    if (this.__isDisposed) Score.Errors.raise(Score.Errors.objectDisposed);
    return this.__sendMessage(ServerMessageTypes.create, [className]);}
public createReference(obj: any): ServerReference {
```

```
/// Creates reference to object that can be sent to target window.
if (this.__isDisposed) Score.Errors.raise(Score.Errors.objectDisposed);
if (!type.isFunction(obj) && !type.isObject(obj))
    Score.Errors.raise("References only created for constructors
        and running objects.");
var reference = new ServerReference( );
reference.oid = 'o:' + new Date( ).getTime( ) + (++this.__idCount);
var created = false;
if (type.isFunction(obj)) {
    obj = new obj(this);
    created = true;
}
for (var m in obj) {
    var v = obj[m];
    switch (type.of(v)) {
        case 'function':
            if (!StringEx.startsWith(m, '_') && m != 'dispose'
                && m != 'isDisposed') {
                // Create a client side proxy for this method.
                reference.methods.push(m);
            }
            break;
        case 'object':
            if (v instanceof Score.Event) {
                // Create a client side proxy for this event.
                Listener is
                // setup on this side and anytime an event is fired it
                gets
                // marshaled to the client who will dispatch it to any
                listeners.
                (function(event) {
                    reference.events.push(event);
                    (<Score.Event>v).add(( ) => {
                        this.__sendEvent(reference.oid, event,
                            ArrayEx.copy(arguments)); });
                })(m);
            }
            break;
    }
}
this.__references[reference.oid] = {obj: obj, created: created,
    hasEvents: reference.events.length > 0 };
return reference;
}
public register(className: string, constructor: any): void {
    /// Registers constructor or running instance of a class with server
    if (this.__isDisposed) Score.Errors.raise(Score.Errors.objectDisposed);
    if (!type.isFunction(constructor) && !type.isObject(constructor))
        Score.Errors.raise("Constructors and running objects remotable.")
    this.__classes[className] = constructor; }
// IDisposable implementation
public dispose ( ): void {
    if (!this.__isDisposed) {
        this.__sendDispose( );
        this.__onDispose({ });
        Server.__unregister(this);
        this.__isDisposed = true; }
}
public isDisposed ( ): bool {
    return this.__isDisposed; }
public isRemoteReady( ): bool {
    return this.__isRemoteReady; }
public equals(obj: any): bool {
    return this.target === obj.target; }
```

The following script is used to implement various methods, including: a method used by either or both the client and server for dispatching and processing messages received from another iframe, depending upon the type of message:

```
private __onMessageRecieved(event: IWindowMessageEvent): void {
    var message: IServerMessage = type.isString(event.data) ?
        serializer.parse(event.data) : event.data;
    // Generate proxies for references
    ArrayEx.each(message.args || [ ], (value:any, index?:number) => {
        // Create proxy's for any server references.
        if (Type.isObject(value) && value.__metadata &&
            value.__metadata.type ===
            'Score.Remoting.ServerReference') {
                message.args[index] =
                    this.__createProxy(<ServerReference>value); }
    });
    // Process message
    switch (message.type) {
        case ServerMessageTypes.ready:
            this.__onReady(message);
            break;
        case ServerMessageTypes.create:
            this.__onCreate(message);
            break;
        case ServerMessageTypes.dispose:
            this.__onDispose(message);
            break;
        case ServerMessageTypes.event:
            this.__onEvent(message);
            break;
        case ServerMessageTypes.invoke:
            this.__onInvoke(message);
            break;
        case ServerMessageTypes.progress:
            this.__onProgress(message);
            break;
        case ServerMessageTypes.reject:
            this.__onReject(message);
            break;
        case ServerMessageTypes.resolve:
            this.__onResolve(message);
            break;
    }
}
```

The following script is used to implement various methods, including: a method used by the server to send a message to a client that the server is ready to communicate:

```
private __onReady(message: IServerMessage): void {
    if (!this.__isRemoteReady) {
        // Acknowledge the PING and signal ready
        this.__isRemoteReady = true;
        this.__postMessage('{"type":"ready"}');
        this.onRemoteReady.trigger(this); }
}
```

The following script is used to implement various methods, including: a method used by the server to return an object of the requested type to the client:

```
private __onCreate(message: IServerMessage): void {
    var className = message.args[0];
    if (className in this.__classes) {
        var constructor = this.__classes[className];
        try {
            var reference = this.createReference(constructor);
            this.__sendResponse(ServerMessageTypes.resolve,
                [reference], message.id);
        } catch (e) {
            this.__sendResponse(ServerMessageTypes.reject, [e],
                message.id); }
    } else {
        this.__sendResponse(ServerMessageTypes.reject, ['Class not
            found'], message.id); }
}
```

The following script is used to implement various methods, including: a method used by the server and client to dispose of references held by either the server or the client:

```
private __onDispose(message: IServerMessage): void {
    var __disposeOfReference = (oid) => {
        var ref = this.__references[oid];
        if (ref.hasEvents) {
            // Remove server from event listener list.
            for (var m in ref.obj) {
                var v = ref.obj[m];
                if (Type.isObject(v) && v instanceof Score.Event)
                    (<Score.Event>v).remove( ); }
        }
        if (ref.created && Type.isDisposable(ref.obj)) ref.obj.dispose( );
    }
    if (!StringEx.isNullOrEmpty(message.oid)) {
        // Dispose of a specific reference
        if (message.oid in this.__references) {
            try {
                __disposeOfReference(message.oid);
            } finally {
                delete this.__references[message.oid];
            }
        }
    } else {
        // Dispose of all references
        for (var m in this.__references) {
            __disposeOfReference(m);
        }
        this.__references = { }; }
}
```

The following script is used to implement various methods, including: a method used by the client to dispatch an event received from a server iframe to listeners running in the client iframe:

```
private __onEvent(message: IServerMessage): void {
    if (message.oid in this.__references) {
        var reference = this.__references[message.oid];
        try {
            var __event =
                (<Score.Event>reference.obj[message.method]);
            __event.trigger.apply(__event, message.args);
        } catch (e) {
        }
    }
}
```

The following script is used to implement various methods, including: a method used by the server to invoke a method called by a client:

```
private __onInvoke(message: IServerMessage): void {
    if (message.oid in this.__references) {
        var reference = this.__references[message.oid];
        try {
            var response =
                reference.obj[message.method].apply(reference.obj,
                message.args);
            if (Type.isPromise(response)) {
                (<IPromise>response).then(this.__safeCall(( ) => {
                    this.__sendResponse(ServerMessageTypes.resolve,
                        ArrayEx.copy(arguments), message.id);
                }), this.__safeCall(( ) => {
                    this.__sendResponse(ServerMessageTypes.reject,
                        ArrayEx.copy(arguments), message.id);
                }), this.__safeCall(( ) => {
                    this.__sendResponse(ServerMessageTypes.progress,
                        ArrayEx.copy(arguments), message.id);
                }));
            } else {
                this.__sendResponse(ServerMessageTypes.resolve,
                    [response], message.id);
            }
        } catch (e) {
            this.__sendResponse(ServerMessageTypes.reject, [e],
                message.id);
        }
    } else {
        this.__sendResponse(ServerMessageTypes.reject, ['Object not
            found'], message.id);
    }
}
```

The following script is used to implement various methods, including: a method used by the client to update the client on the progress of a server request:

```
private __onProgress(message: IServerMessage): void {
    /// <summary>CLIENT: Update the client on the progress of a server
    /// request.</summary>
    if (message.id in this.__responses) {
        this.__responses[message.id].notifyWith({ }, message.args); }
}
```

The following script is used to implement various methods, including: a method used by the client to notify the client that a server request has failed:

```
private __onReject(message: IServerMessage): void {
    /// <summary>CLIENT: Notifies the client that a server request
    /// failed.</summary>
    if (message.id in this.__responses) {
        try {
            this.__responses[message.id].rejectWith({ }, message.args);
        } finally {
            delete this.__responses[message.id]; }
    }
}
```

The following script is used to implement various methods, including: a method used by the client to notify the client that a server request has succeeded and to return the results of the request to the client:

```
private __onResolve(message: IServerMessage): void {
    if (message.id in this.__responses) {
        try {
            this.__responses[message.id].resolveWith({ },
                message.args);
        } finally {delete this.__responses[message.id]; } }
}
```

The following script is used to implement various methods, including: a method used by the client to create a client-side proxy for a server passed reference:

```
private __createProxy(reference: ServerReference): any {
    var __this = this;
    function __invoke(oid, method): ( ) => any {
        return function ( ) {
            if (__this.__isDisposed)
                Score.Errors.raise(Score.Errors.objectDisposed);
            return __this.__sendMessage(ServerMessageTypes.invoke,
                ArrayEx.copy(arguments), oid, method); };
    }
    var obj = { __isDisposed: false };
    obj['dispose'] = function ( ) {
        __this.__sendDispose(reference.oid);
        obj.__isDisposed = true;
        delete __this.__references[reference.oid];
    };
    obj['isDisposed'] = function ( ) { return obj.__isDisposed; };
    ArrayEx.each(reference.methods, (m) => {
```

-continued

```
    obj[<string>m] = __invoke(reference.oid, <string>m);
  });
  ArrayEx.each(reference.events, (m) => {
    obj[<string>m] = new Event( );
  });
  this.__references[reference.oid] = { obj: obj, created: true, hasEvents:
    false };
  return obj;
}
```

The following script is used to implement various methods, including: a method used by the client to send a message to a server and then wait for a response:

```
private __sendMessage(type: string, args: any[ ], oid?: string, method?:
    string): IPromise {
  var message: IServerMessage = {
    type: type,
    id: this.__getMessageId( ),
    args: args };
  if (Type.isString(oid)) message.oid = oid;
  if (Type.isString(method)) message.method = method;
  var dfd = createDeferred( );
  this.__responses[message.id] = dfd;
  this.__postMessage(message);
  return dfd.promise( );
}
```

The following script is used to implement various methods, including: a method used by the server to send a response to a message to the client:

```
private __sendResponse(type: string, args: any[ ], id: string): void {
  this.__postMessage({ type: type, id: id, args: args });
}
```

The following script is used to implement various methods, including: a method used by the server to send an event to a client:

```
private __sendEvent( oid: string, event: string, args: any[ ]): void {
  this.__postMessage({
    type: ServerMessageTypes.event,
    id: this.__getMessageId( ),
    oid: oid,
    method: event,
    args: args
  });
}
```

The following script is used to implement various methods, including: a method used by the client to notify a server that a particular reference, or all references, should be disposed, and various postMessage methods:

```
private __sendDispose(oid?: string): void {
  this.__postMessage({
    type: ServerMessageTypes.dispose,
    args: [ ],
    oid: oid });
}
private __getMessageId( ): string {
  return 'm:' + new Date( ).getTime( ) + (++this.__idCount);
}
private __postMessage(message: string): void;
private __postMessage(message: IServerMessage): void;
private __postMessage(message: any): void {
```

```
    this.target.postMessage(typeof message === 'string' ? message :
      serializer.stringify(message), this.targetOrigin ===
      'javascript:' ?
      '*' : this.targetOrigin);
}
```

The following script is used to implement various methods, including: a method used to wrap a callback with a function that ensures that the server hasn't been disposed before letting the callback happen:

```
private __safeCall(cb: ( ) => any): ( ) => any {
  var __this = this;
  return function ( ) {
    if (!__this.__isDisposed) {
      return cb.apply(__this, arguments); } };
}
```

The following script is used to implement various static methods, including: a method for disposing of references used by a particular iframe when the iframe is unloaded or disposed, and to prevent unregistered calls:

```
static __disposeServers( ): void {
  var servers = __servers;
  __servers = [ ]; // Prevent any unregister calls
  ArrayEx.each(servers, (obj) => {
    try { obj.dispose( ); } catch(e) { } });
}
```

The following script is used to implement various static methods, including: a method for ensuring that messages intended for particular iframes are from the same domain for security purposes:

```
static __dispatchMessage(event: IWindowMessageEvent): void {
  var server: Server;
  ArrayEx.each(__servers, (value) => {
    server = <Server>value;
    if (server.target === event.source) {
      if (server.targetOrigin === '*' || event.origin ===
        server.targetOrigin || event.origin ===
        document.location.protocol + '//' + document.location.host) {
        server.__onMessageRecieved(event); }
      return false; } });
}
```

The following script is used to implement various methods, including: a method used to verify whether a particular server exists before creating a server, and to save servers:

```
static __register(server: Server) {
  // Verify that a server for this window doesn't exist
  var found = false;
  ArrayEx.each(__servers, (value) => {
    if (server.equals(value)) {
      found = true;
      return false; }
  });
  if (found) throw "Remoting server for window already created.";
  __servers.push(server);
}
```

The following script is used to implement various methods, including: a method used to remove particular servers:

```
static _unregister(server: Server) {
    ArrayEx.each(_servers, (value:any, index?:number) => {
        if (server.equals(value)) {
            _servers.splice(index, 1);
            return false; } });
}
```

The following script is used to implement various type-checked interfaces (e.g., ready, create, dispose, event, invoke, progress, reject, resolve), wherein each interface includes a unique identifier, the type of message being sent, any arguments to be encoded into the message, any object ID that the message is related to, and any method that the object is related to:

```
interface IServerMessage {
    id?: string;        // Unique ID of the message
    type?: string;      // Type of message being sent
    args?: any[ ];      // Encoded array of message arguments
    oid?: string;       // Object ID message is related to
    method?: string;    // Method message is related to
}
var ServerMessageTypes = {
    ready: 'ready',
    create: 'create',
    dispose: 'dispose',
    event: 'event',
    invoke: 'invoke',
    progress: 'progress',
    reject: 'reject',
    resolve: 'resolve'
};
export class ServerReference {
    public _metadata = { type: 'Score.Remoting.ServerReference' };
    public oid = ";
    public methods = [ ];
    public events = [ ];
};
serializer.registerType('Score.Remoting.ServerReference',
    ServerReference);
```

The following script is used to set up various window events, such as adding listeners, and to export type-checked interfaces that are created:

```
Event.addListener(window, 'message', function (event) {
    // Check to see if window is still valid, note that JSON becomes
    // inaccessible if a frame has been detached from its parent window.
    if (typeof window['JSON'] !== 'undefined') {
        Server._dispatchMessage(<any>event); }
});
Event.addListener(window, 'unload', function (event) {
    // Check to see if window is still valid, note that JSON becomes
    // inaccessible if a frame detached from its parent window.
    if (typeof window['JSON'] !== 'undefined') {
        Server._disposeServers( ); }
});
export interface IWindowMessageEvent {
    data: any;          // Data passed for message
    origin: string;     // Senders domain for security purposes
    source: Window;     // Sending window
}
```

Note that the following scripts are used to implement a variety of interfaces, also referred to as "remoting methods". Note also that the Remotable Contract Implementation is not intended to be limited to the interfaces illustrated below, and that the following exemplary interfaces are provided as examples of how any desired type of interface may be implemented. For example, the following script is used to define a remoting method that returns anything:

```
export interface IAnyResult extends Score.IPromise {
    done (onDone: (value:any) => any): IAnyResult;
    fail (onFail: (error: string) => any): IAnyResult;
    progress (onProgress: (value:any) => any): IAnyResult;
    then (onDone: (value:any) => any, onFail: (error: string) => any,
        onProgress?: (value:any) => any): IAnyResult; }
```

The following script is used to define a remoting method that returns a Boolean (i.e., a "bool"):

```
export interface IBoolResult extends Score.IPromise {
    done (onDone: (value:bool) => any): IBoolResult;
    fail (onFail: (error: string) => any): IBoolResult;
    progress (onProgress: (value:bool) => any): IBoolResult;
    then (onDone: (value:bool) => any, onFail: (error: string) => any,
        onProgress?: (value:bool) => any): IBoolResult; }
```

The following script is used to define a remoting method that returns a date:

```
export interface IDateResult extends Score.IPromise {
    done (onDone: (value:Date) => any): IDateResult;
    fail (onFail: (error: string) => any): IDateResult;
    progress (onProgress: (value:Date) => any): IDateResult;
    then (onDone: (value:Date) => any, onFail: (error: string) => any,
        onProgress?: (value:Date) => any): IDateResult; }
```

The following script is used to define a remoting method that returns a number:

```
export interface INumberResult extends Score.IPromise {
    done (onDone: (value:number) => any): INumberResult;
    fail (onFail: (error: string) => any): INumberResult;
    progress (onProgress: (value:number) => any): INumberResult;
    then (onDone: (value:number) => any, onFail: (error: string) => any,
        onProgress?: (value:number) => any): INumberResult; }
```

The following script is used to define a remoting method that returns any desired string:

```
export interface IStringResult extends Score.IPromise {
    done (onDone: (value:string) => any): IStringResult;
    fail (onFail: (error: string) => any): IStringResult;
    progress (onProgress: (value:string) => any): IStringResult;
    then (onDone: (value:string) => any, onFail: (error: string) => any,
        onProgress?: (value:string) => any): IStringResult; }
```

The following script is used to define a remoting method that has no defined return type:

```
export interface IVoidResult extends Score.IPromise {
    done (onDone: ( ) => any): IVoidResult;
    fail (onFail: (error: string) => any): IVoidResult;
progress (onProgress: ( ) => any): IVoidResult;
then (onDone: ( ) => any, onFail: (error: string) => any, onProgress?:
    ( ) => any): IVoidResult; }
```

The following script is used to define a remoting method for returning value types asynchronously:

```
export function returnValue(value?: any): Score.IPromise {
    var dfd = Score.createDeferred( );
    dfd.resolve(value);
    return dfd.promise( ); }
```

The following script is used to define a remoting method for returning errors asynchronously:

```
export function returnError(message:string): Score.IPromise {
    var dfd = Score.createDeferred( );
    dfd.reject(message);
    return dfd.promise( ); }
```

Figure 2:
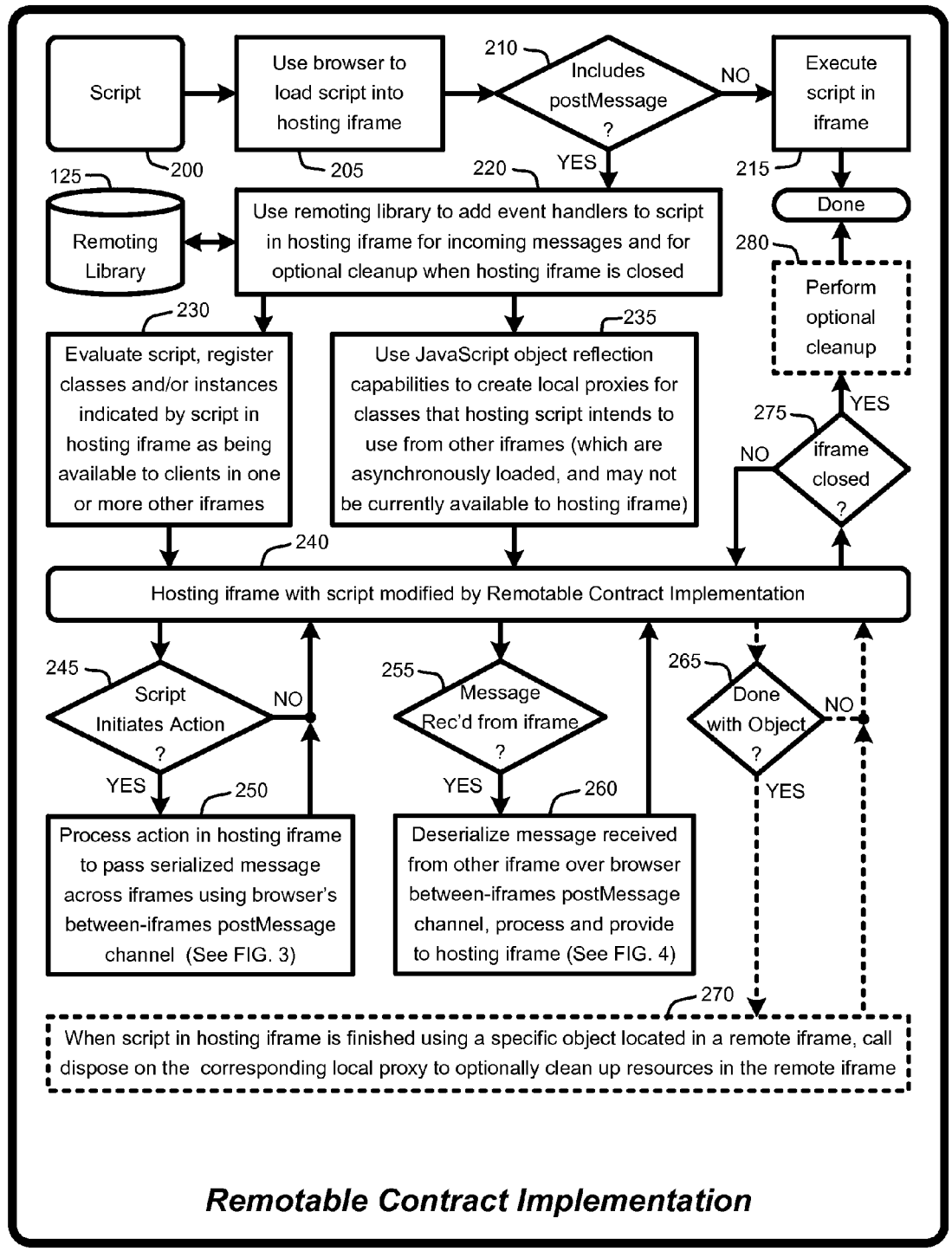
FIG. 2 provides a general flow diagram that illustrates exemplary methods for implementing various techniques for evaluating and processing scripts to enable passing rich control flows between iframes using the Remotable Contract Implementation, as described herein.
Figure 3:
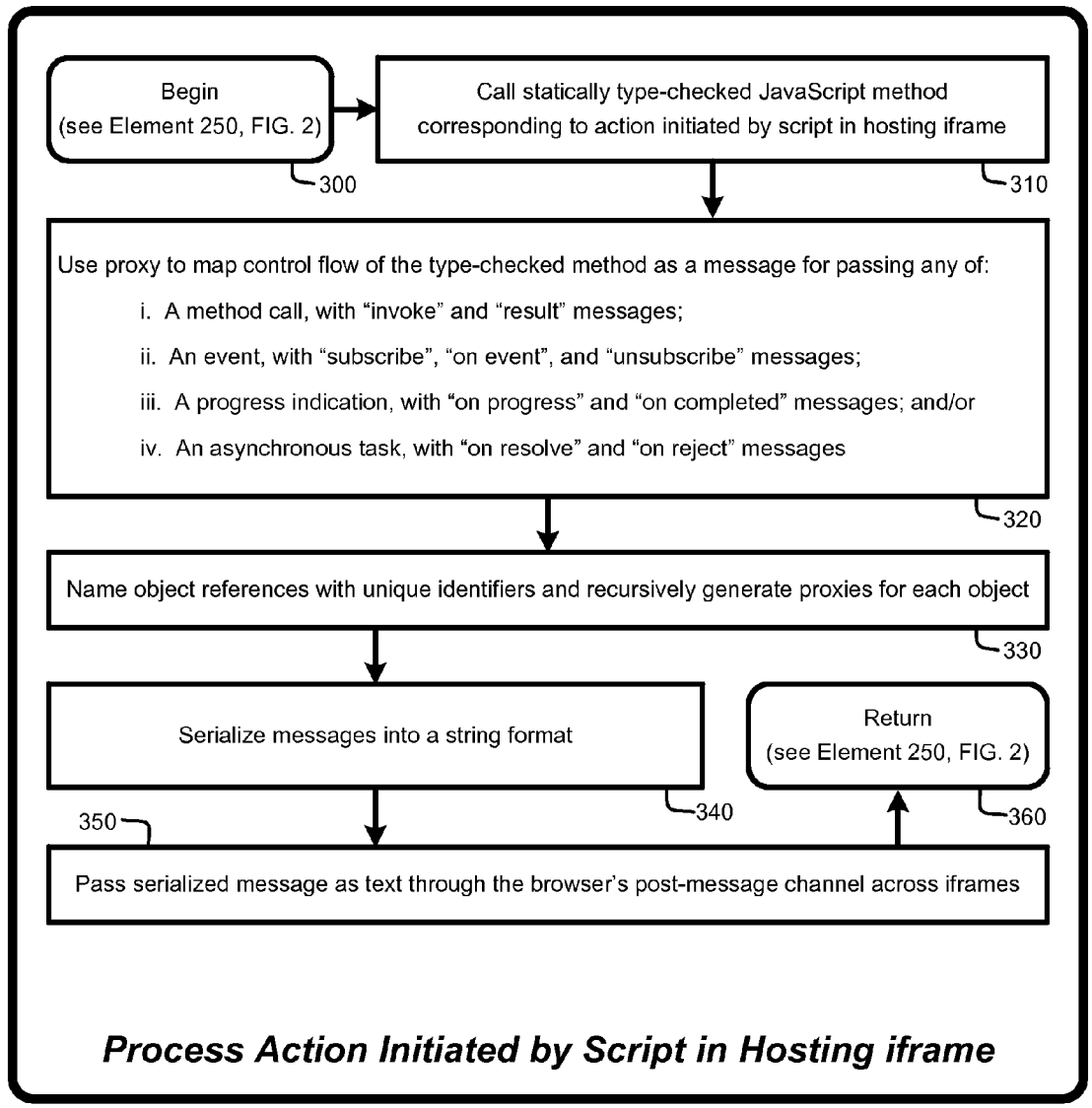
FIG. 3 provides a general flow diagram that illustrates exemplary methods for processing actions initiated in a hosting iframe to pass corresponding serialized messages to other iframes via a browser postMessage channel using the Remotable Contract Implementation, as described herein.
Figure 4:
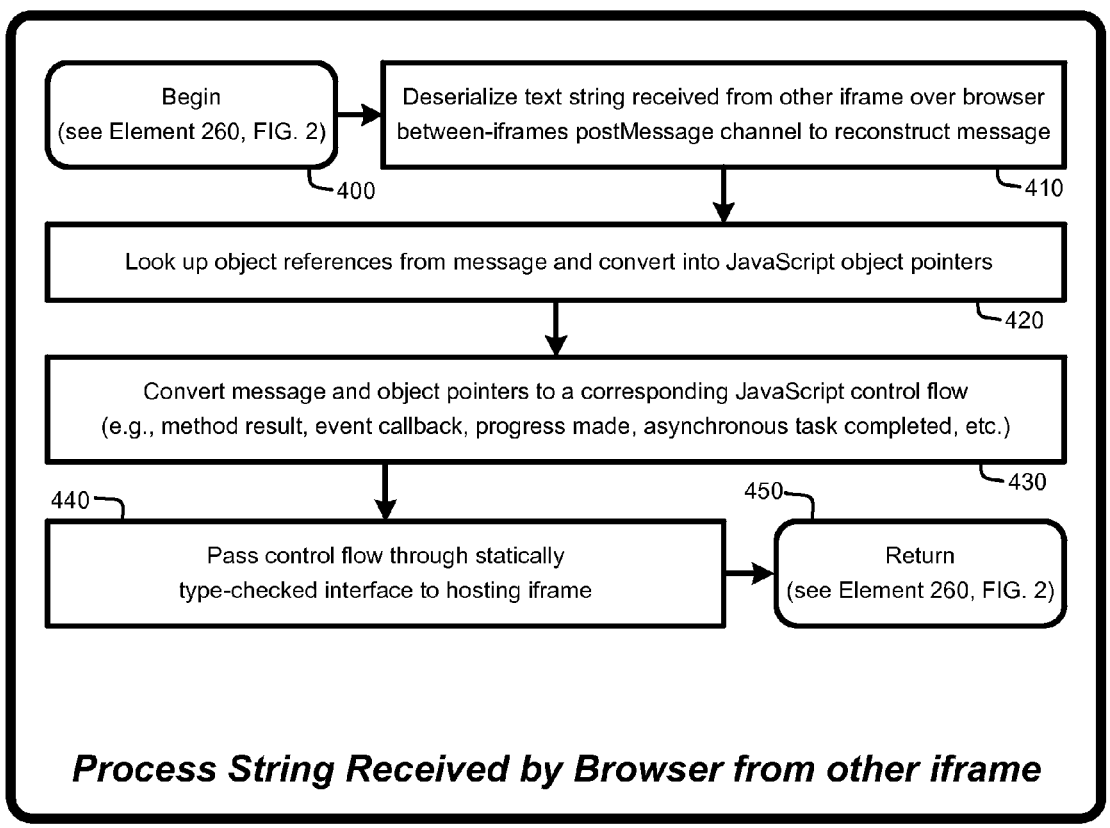
FIG. 4 provides a general flow diagram that illustrates exemplary methods for deserializing and processing messages received from other iframes via a browser postMessage channel using the Remotable Contract Implementation, as described herein.

3.0 Operational Summary:

The processes described above with respect to FIG. 1 and in further view of the detailed description provided above in Sections 1 and 2, are illustrated by the general operational flow diagrams of FIG. 2 through FIG. 4. In particular, FIG. 2 provides an exemplary operational flow diagram that summarizes the operation of some of the various embodiments of the Remotable Contract Implementation. FIG. 3 and FIG. 4 provide flow diagrams that expand on particular elements of FIG. 2. Note that FIG. 2 through FIG. 4 are not intended to provide exhaustive representations of all of the various embodiments of the Remotable Contract Implementation described herein, and that the embodiments represented by these figures are provided only for purposes of explanation.

Further, it should be noted that any boxes and interconnections between boxes that are represented by broken or dashed lines in FIG. 4 represent optional or alternate embodiments of the Remotable Contract Implementation described herein, and that any or all of these optional or alternate embodiments, as described below, may be used in combination with other alternate embodiments that are described throughout this document.

In general, as discussed in detail above, the remoting library is leveraged by script hosted in an iframe to generate statically type-checked interfaces implemented by a server hosted in another iframe, and/or by implementing statically type-checked interfaces and hosting a server in their iframe. More specifically, as illustrated by FIG. 2, operation of the Remotable Contract Implementation begins operation by providing a script 200 written in scripting languages such as TypeScript, JavaScript, AJAX, etc., to be loaded 205 by a browser into a hosting iframe. As noted above, any particular iframe can act as either or both a host and a target with respect to other iframes.

If the script 200 loaded into the iframe includes 210 postMessage script for processing in view of the remoting library 125, then that script is further processed by Remotable Contract Implementation, otherwise, it is simply executed 215 using conventional script execution techniques. In particular, assuming that the script is to undergo further processing, as shown by element 220, the Remotable Contract Implementation uses the remoting library 125 to add event handlers to the script in the hosting iframe for incoming messages and for optional resource cleanup when the hosting iframe is closed.

Further, the Remotable Contract Implementation continues by evaluating 230 the script and registering classes and/or instances indicated by the script in the hosting iframe as being available to clients in one or more other iframes. In addition, as illustrated by element 235, the Remotable Contract Implementation uses JavaScript object reflection capabilities in combination with the remoting library to create local proxies for classes that the hosting script intends to use from other iframes (which are asynchronously loaded, and may or may not be currently available to the hosting iframe). Once these processes are complete, the hosting iframe 240 contains a script modified by the Remotable Contract Implementation and ready for execution within the iframe.

Then, whenever the script in the hosting iframe 240 initiates an action 245, the Remotable Contract Implementation processes the action in the hosting iframe to generate and pass a corresponding serialized message across iframes boundaries using the browser's between-iframes postMessage channel. Note that element 250 of FIG. 2 is expanded in further detail by the flow diagram of FIG. 3, discussed in further detail below.

Further, when a message is received 255 from another iframe over the browser between-iframes postMessage channel (i.e., hosting iframe is also acting as a target iframe in this instance), as illustrated by element 260, the Remotable Contract Implementation deserializes the received message, processes that message, and provides whatever information or control flow corresponds to that message to the hosting iframe. Note that element 260 of FIG. 2 is expanded in further detail by the flow diagram of FIG. 4, discussed in further detail below.

In addition, when the hosting iframe is done 265 with one or more objects from another iframe, the Remotable Contract Implementation optionally disposes of those objects. More specifically, as illustrated by element 270 of FIG. 2, when the script in the hosting iframe is finished using a specific object located in a remote iframe, the Remotable Contract Implementation optionally calls dispose on the corresponding local proxy to optionally clean up resources in the remote iframe.

Similarly, when the hosting iframe is closed 275, the Remotable Contract Implementation performs 280 optional cleanup for any resources no longer being used by the hosting iframe.

With respect to FIG. 3, as noted above, this figure expands upon element 250 of FIG. 2. In general, FIG. 3 illustrates how the Remotable Contract Implementation processes actions initiated by a script in the hosting iframe. More specifically this processing begins 300 by using the remoting library 125 to call 310 a statically type-checked JavaScript method corresponding to the action initiated by script in hosting iframe.

Next, the Remotable Contract Implementation uses a proxy generated using the remoting library 125 to map 320 the control flow of the type-checked method as a message for passing any of:

1. A method call, with "invoke" and "result" messages;
2. An event, with "subscribe", "on event", and "unsubscribe" messages;
3. A progress indication, with "on progress" and "on completed" messages; and/or
4. An asynchronous task, with "on resolve" and "on reject" messages.

Next, the Remotable Contract Implementation names 330 any object references with unique identifiers and recursively generates proxies for each object using the remoting library 125. The Remotable Contract Implementation then serializes 340 the resulting message into a string format. This serialized message is then passed 350 as text through the browser's post-message channel across iframes to whatever target iframes are expecting the message. As illustrated by FIG. 3, processing of the action initiated by the script in the hosting iframe then returns 360 to element 250 of FIG. 2.

With respect to FIG. 4, as noted above, this figure expands upon element 260 of FIG. 2. In general, FIG. 4 illustrates how the Remotable Contract Implementation processes text strings received by the browser from other iframes for use by the hosting iframe (which in this instance would be acting as a target iframe). More specifically this processing begins 400 by deserializing 410 the text string received from any other iframe over browser between-iframes postMessage channel to reconstruct the message. The Remotable Contract Implementation then further processes the deserialized message by looking up 420 object references from the deserialized message and using that information to convert the object references into JavaScript object pointers.

Next, the Remotable Contract Implementation converts 430 the deserialized message and the corresponding object pointers to a corresponding JavaScript control flow (e.g., method result, event callback, progress made, asynchronous task completed, etc.). This control flow is then passed 440 through a corresponding statically type-checked interface to the hosting iframe. As illustrated by FIG. 4, processing of the string received by the browser from another iframe then returns 450 to element 260 of FIG. 2.

In summary, the Remotable Contract Implementation performs the following processes:

1. The JavaScript code or script (optionally compiled from TypeScript source) is loaded into the iframe by the browser.
2. The remoting library is initialized, and it adds its event handlers for incoming messages and optional cleanup when the hosting iframe is closed.
3. The Remotable Contract Implementation evaluates the JavaScript code or script and registers any classes or instances that the script wants to make available to clients in other iframes.
4. The Remotable Contract Implementation evaluates the JavaScript code or script and creates local proxies for any classes that the script wants to use from other iframes (these iframes are asynchronously loaded and may not be available yet).
5. When the JavaScript code or script in an iframe initiates an action:
   a. A statically type-checked method is called
   b. The proxy (generated from the remoting library with the help of JavaScript's dynamic reflection capabilities) maps the control-flow as message passing either:
      i. A method call, with "invoke" and "result" messages
      ii. An event, with "subscribe", "on event", and "unsubscribe" messages
      iii. A progress indication, with "on progress" and "on completed" messages
      iv. A asynchronous task, with "on resolve" and "on reject" messages
   c. Object references are named with a unique identifier, and proxies are generated recursively for those objects
   d. The messages are serialized into a string format
   e. The serialized text is passed through the browser's post-message channel across iframes
6. When an incoming message is received over the browser's between-iframes post-message channel, it follows the reverse process:
   a. The text is deserialized into a message
   b. Object references are looked up and converted into JavaScript object pointers
   c. Conversion to JavaScript control flow is performed (e.g. method result, event callback, progress made, or asynchronous task completed)
   d. Control flow is passed through the statically type-checked interfaces made available via the remoting library.
7. When the JavaScript code or script in the hosting iframe is finished using a specific object located in remote iframe, the Remotable Contract Implementation optionally calls dispose on the local proxy through another interface to optionally clean up the resources in the remote iframe.

Figure 5:
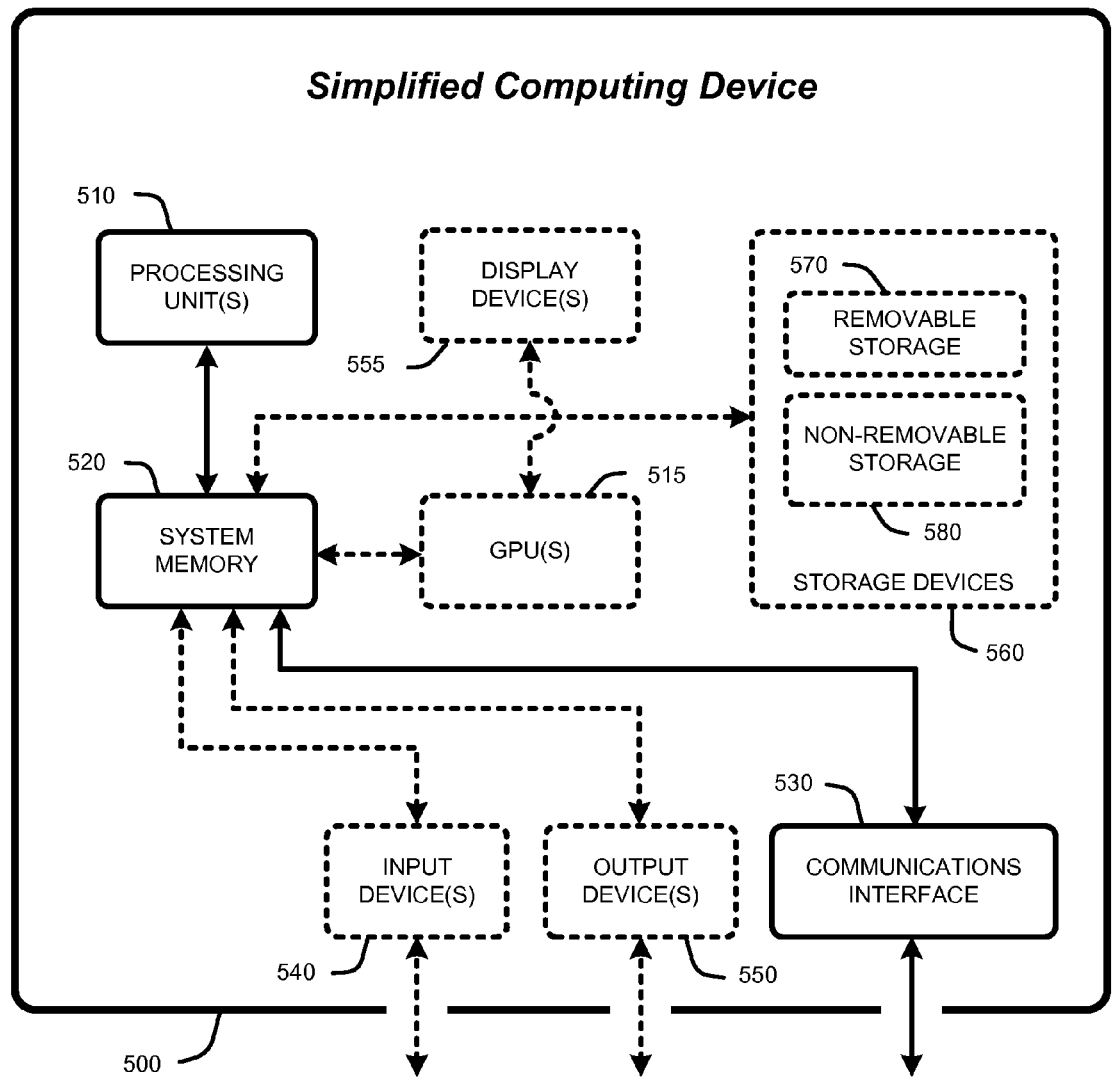
FIG. 5 is a general system diagram depicting a simplified general-purpose computing device having simplified computing and I/O capabilities for use in implementing various embodiments of the Remotable Contract Implementation, as described herein.

4.0 Exemplary Operating Environments:

The Remotable Contract Implementation described herein is operational within numerous types of general purpose or special purpose computing system environments or configurations. FIG. 5 illustrates a simplified example of a general-purpose computer system on which various embodiments and elements of the Remotable Contract Implementation, as described herein, may be implemented. It should be noted that any boxes that are represented by broken or dashed lines in FIG. 5 represent alternate embodiments of the simplified computing device, and that any or all of these alternate embodiments, as described below, may be used in combination with other alternate embodiments that are described throughout this document.

For example, FIG. 5 shows a general system diagram showing a simplified computing device such as computer 500. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement the Remotable Contract Implementation, the device should have a sufficient computational capability and system memory to enable basic computational operations. In particular, as illustrated by FIG. 5, the computational capability is generally illustrated by one or more processing unit(s) 510, and may also include one or more GPUs 515, either or both in communication with system memory 520. Note that that the processing unit(s) 510 of the general computing device of may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 5 may also include other components, such as, for example, a communications interface 530. The simplified computing device of FIG. 5 may also include one or more conventional computer input devices 540 or combinations of such devices (e.g., pointing devices, keyboards, audio input devices, voice or speech-based input and control devices, video input devices, haptic input devices, touch input devices, devices for receiving wired or wireless data transmissions, etc.). The simplified computing device of FIG. 5 may also include other optional components, such as, for example, one or more conventional computer output devices 550 (e.g., display device(s) 555, audio output devices, video output devices, devices for transmitting wired or wireless data transmissions, etc.). Note that typical communications interfaces 530, input devices 540, output devices 550, and storage devices 560 for general-purpose computers are well known to those skilled in the art, and will not be described in detail herein.

The simplified computing device of FIG. 5 may also include a variety of computer readable media. Computer readable media can be any available media that can be accessed by computer 500 via storage devices 560 and includes both volatile and nonvolatile media that is either removable 570 and/or non-removable 580, for storage of information such as computer-readable or computer-executable instructions, data structures, program modules, or other data. By way of example, and not limitation, computer readable media may comprise computer storage media and communication media. Computer storage media refers to tangible computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Retention of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the Remotable Contract Implementation described herein, or portions thereof, may be stored, received, transmitted, or read from any desired combination of computer or machine readable media or storage devices and communication media in the form of computer executable instructions or other data structures.

Finally, the Remotable Contract Implementation described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

The foregoing description of the Remotable Contract Implementation has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the Remotable Contract Implementation. It is intended that the scope of the invention be limited not by this detailed description, but rather by the claims appended hereto. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented process for communicating executable scripts between iframe boundaries, comprising:
    using a computer to perform process actions for:
        instantiating a browser application hosting at least two iframes and loading separate scripts containing structured control flow of a scripting language into two or more of the iframes;
        automatically transforming at least a portion of the scripts within one or more of the iframes to cause the transformed scripts within those iframes to generate one or more annotated serialized text messages representing corresponding structured control flow when the transformed scripts initiate corresponding actions within those iframes;
        using a postMessage channel of the browser to transmit each annotated serialized text message from its corresponding iframe to one or more of the other iframes; and
        within any iframe receiving any annotated serialized text message from any other iframe, deserializing that message and converting it back into the corresponding structured control flow for execution within the receiving iframe.

2. The computer-implemented process of claim 1 wherein automatically transforming the scripts within one or more of the iframes further comprises adding annotations to register any classes in the structured control flow of the transformed scripts.

3. The computer-implemented process of claim 2 wherein class members in the structured control flow in any iframe are determined via object reflection.

4. The computer-implemented process of claim 1 further comprising automatically adding type-checked event handlers to the scripts in one or more of the iframes for receiving the text messages from one or more of the other iframes.

5. The computer-implemented process of claim 4 wherein the type-checked event handlers are statically type checked.

6. The computer-implemented process of claim 1 further comprising automatically generating type-checked interfaces from one or more pre-defined proxy stubs for use in processing any serialized text message received from any other iframe.

7. The computer-implemented process of claim 1 wherein each annotated serialized text message further includes information for automatically performing a deterministic dispose of resources associated with any corresponding structured control flow when those resources are no longer being used by any of the iframes.

8. The computer-implemented process of claim 1 wherein the control flow includes one or more of statically typed checked method calls, event calls, progress indicators and asynchronous tasks.

9. A method comprising:
instantiating a browser application on a computing device, the browser application hosting at least two iframes and loading separate scripts containing structured control flow of a scripting language into two or more of the iframes;
automatically transforming the scripts loaded into one or more iframes by adding one or more statically type-checked event handlers to the scripts within those iframes for receiving text messages from one or more of the other iframes;
in response to an action initiated by the structured control flow within any of the iframes by the transformed script within those iframes, automatically transforming at least a portion of that structured control flow into corresponding annotated serialized text messages;
using a postMessage channel of the browser to transmit each annotated serialized text message from its corresponding iframe to one or more of the other iframes; and
within any iframe receiving any annotated serialized text message from any other iframe, deserializing that message and converting it back into the corresponding structured control flow for execution within the receiving iframe.

10. The method of claim 9 wherein automatically transforming the scripts within one or more of the iframes further comprises adding annotations to register any classes in the structured control flow of the transformed scripts.

11. The method of claim 10 wherein class members in the structured control flow in any iframe are determined via object reflection.

12. The method of claim 9 further comprising automatically generating type-checked interfaces from one or more pre-defined proxy stubs for use in processing any serialized text message received from any other iframe.

13. The method of claim 9 wherein each annotated serialized text message further includes information for automatically performing a deterministic dispose of resources associated with any corresponding structured control flow when those resources are no longer being used by any of the iframes.

14. The method of claim 9 wherein the control flow includes one or more of typed checked method calls, event calls, progress indicators and asynchronous tasks.

15. A method for communicating between iframes, comprising:
instantiating two or more iframes within a browser application running on a computing device;
loading scripts containing structured control flow of a scripting language into two or more of the iframes;
generating one or more type-checked interfaces in each iframe from one or more pre-defined proxy stubs for use in processing any serialized text message received from any other iframe;
transforming at least a portion of the scripts loaded into one or more of the iframes to cause the transformed scripts within those iframes to generate one or more annotated serialized text messages representing corresponding structured control flow when the transformed scripts initiate corresponding actions within those iframes;
transmitting each annotated serialized text message from its corresponding iframe to one or more of the other iframes via a browser postMessage channel; and
within any iframe receiving any annotated serialized text message from any other iframe, deserializing that message and converting it back into the corresponding structured control flow for execution within the receiving iframe.

16. The method of claim 15 wherein automatically transforming the scripts within one or more of the iframes further comprises using object reflection to determine any class members in the structured control flow and adding annotations to serialized text messages to register those classes.

17. The method of claim 15 wherein the type-checked interfaces are statically type checked.

18. The method of claim 15 further comprising automatically generating the type-checked interfaces from one or more pre-defined proxy stubs for use in processing any serialized text message received from any other iframe.

19. The method of claim 15 wherein each annotated serialized text message further includes information for automatically performing a deterministic dispose of resources associated with any corresponding structured control flow when those resources are no longer being used by any of the iframes.

20. The method of claim 15 wherein the control flow includes one or more of statically typed checked method calls, event calls, progress indicators and asynchronous tasks.

* * * * *